United States Patent [19]

Eck

[11] 4,338,027
[45] Jul. 6, 1982

[54] LINE OF SIGHT WHEEL ALIGNMENT APPARATUS FOR VEHICLES

[75] Inventor: Leonard F. Eck, McPherson, Kans.

[73] Assignee: Kansas Jack, Inc., McPherson, Kans.

[21] Appl. No.: 84,873

[22] Filed: Oct. 15, 1979

Related U.S. Application Data

[63] Continuation-in-part of Ser. No. 940,823, Sep. 8, 1978, abandoned.

[51] Int. Cl.³ .............................................. G01B 11/26
[52] U.S. Cl. ................................. 356/155; 33/203.12
[58] Field of Search ...................... 356/155; 33/203.12, 33/203.13, 288

[56] References Cited

U.S. PATENT DOCUMENTS

| 2,249,226 | 7/1941 | Peters | 33/288 |
|---|---|---|---|
| 2,755,554 | 7/1956 | MacMillan | 356/138 |
| 2,972,189 | 2/1961 | Holub | 33/288 |
| 3,091,862 | 6/1963 | MacMillan | 33/288 |
| 3,135,052 | 6/1964 | MacMillan | 33/288 |
| 3,159,916 | 12/1964 | Hunter | 356/155 |
| 3,206,862 | 9/1965 | Hunter | 33/288 |
| 3,409,990 | 11/1968 | Vorpahl | 33/288 |
| 3,439,987 | 4/1969 | Bacher et al. | 356/155 |
| 3,501,240 | 3/1970 | Haynes | 356/155 |
| 3,876,310 | 4/1975 | Berndt | 356/155 |
| 3,951,551 | 4/1976 | MacPherson | 356/155 |

Primary Examiner—John K. Corbin
Assistant Examiner—Rodney Bovernick
Attorney, Agent, or Firm—Fishburn, Gold and Litman

[57] ABSTRACT

An apparatus for detecting the alignment of the wheels of vehicles such as automobiles, truck tractors and trailers, includes an adjustable, wheel-engaging and target supporting structure mountable upon a vehicle wheel rim and has spaced arms extended laterally from cardinal points of the wheel. Indicia bearing targets respectively located on the arms provide scales for indicating the angular alignment of the vehicle wheels for conventional measurements such as caster, camber, toe-in, and steering axis cant. A sighting instrument establishes a line of sight parallel to and longitudinally spaced from the vehicle. The line of sight is directed toward a target and impinges upon a discrete mark on the scale thereof. Comparison of the points of impingement upon targets located at opposite cardinal points establishes angular relations therebetween which correspond to alignment measurements.

28 Claims, 30 Drawing Figures

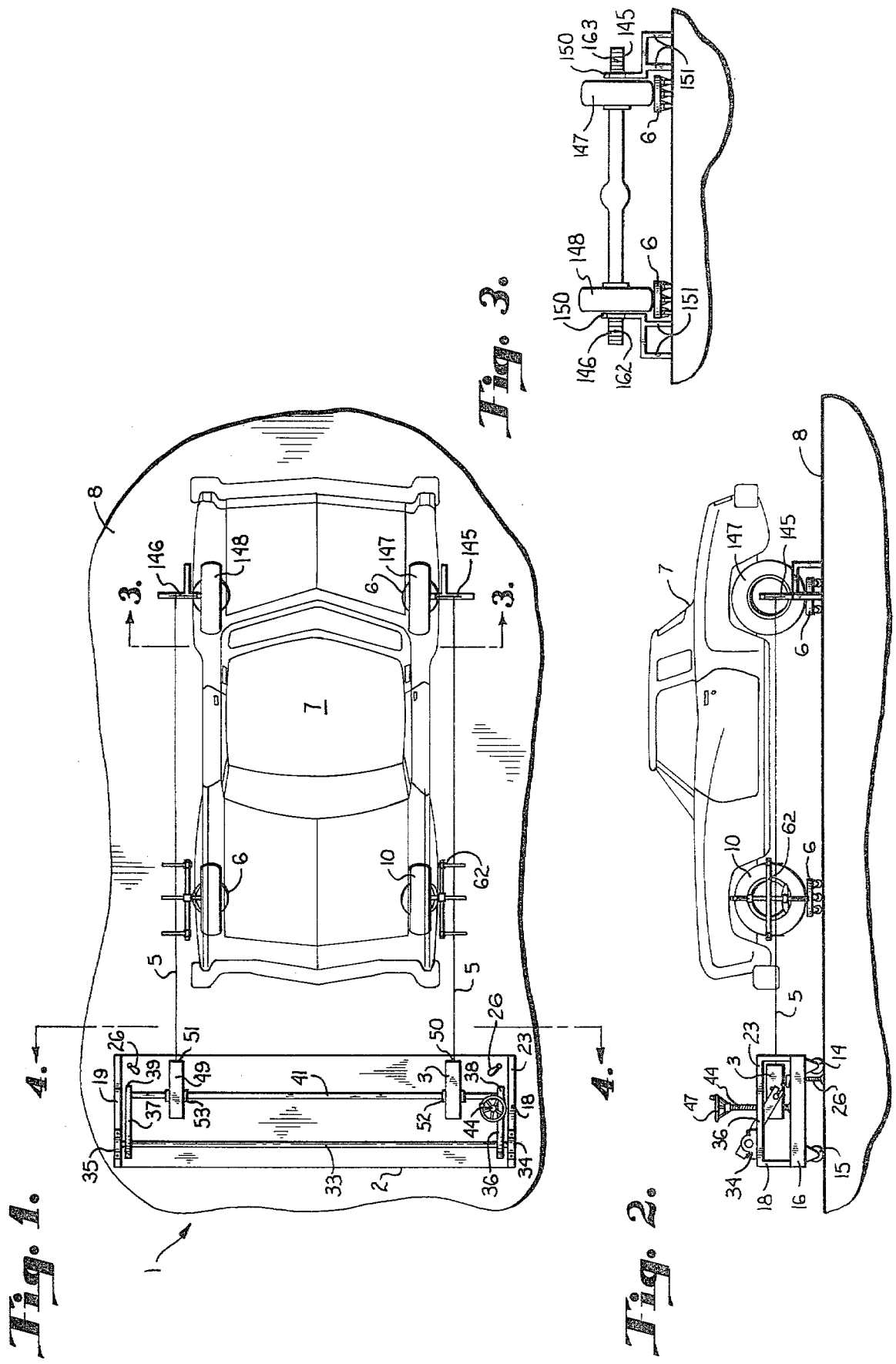

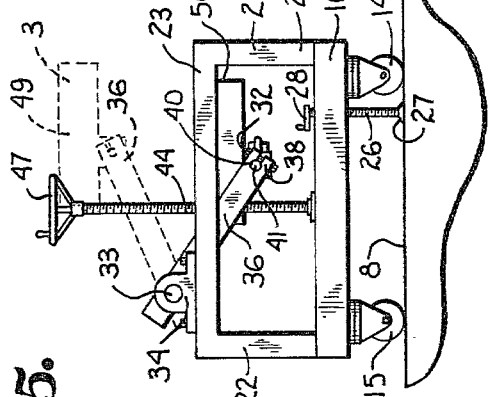
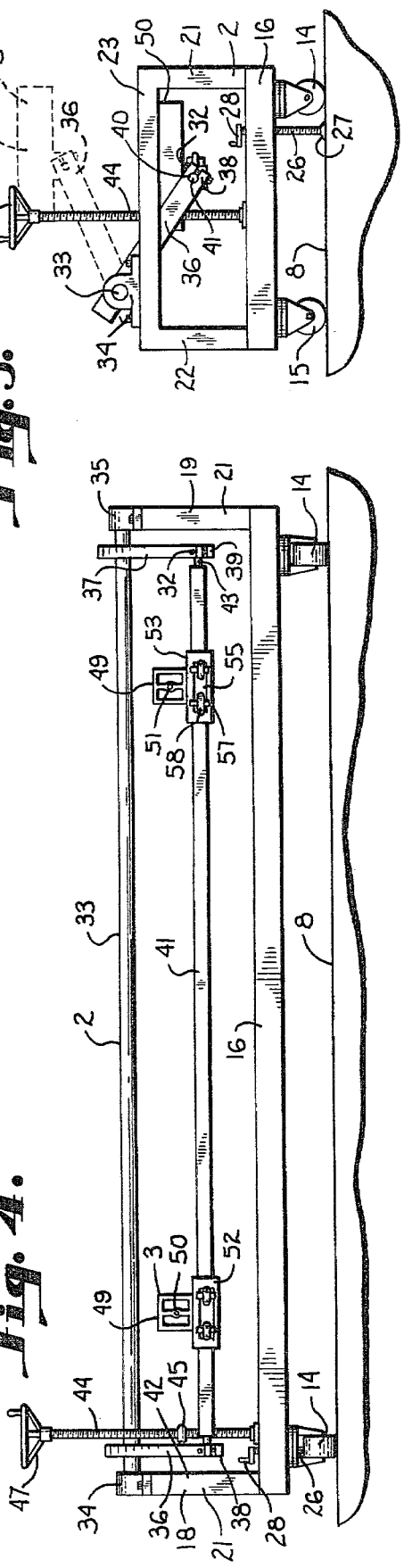
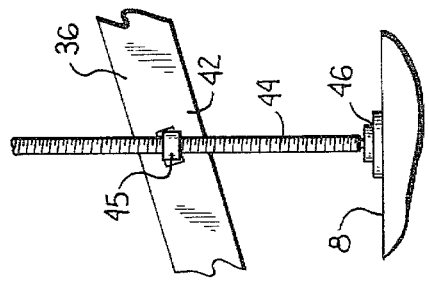
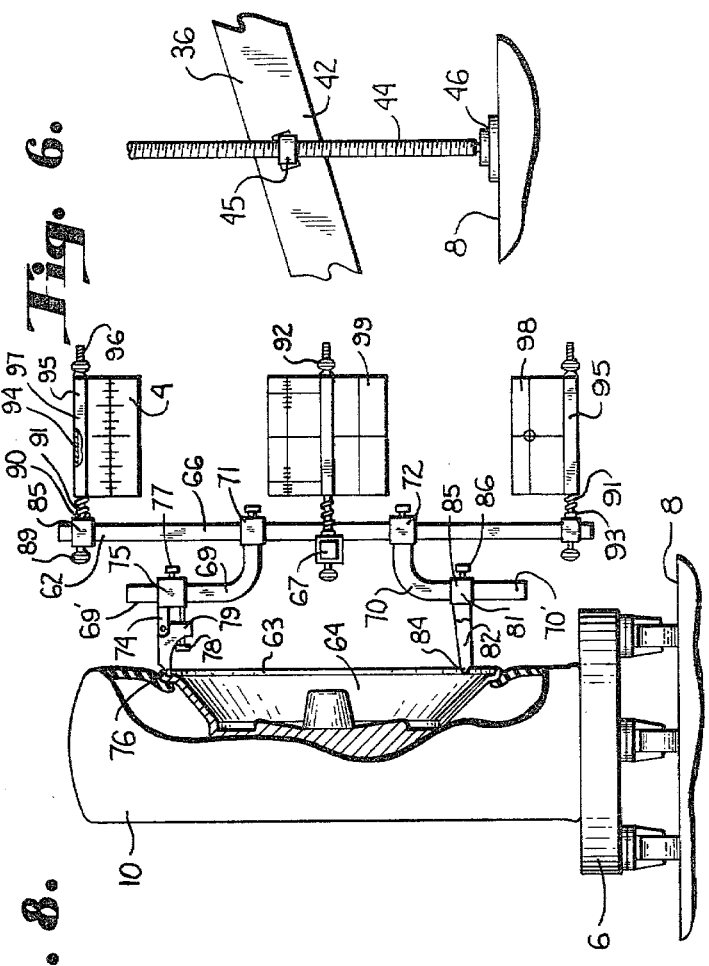
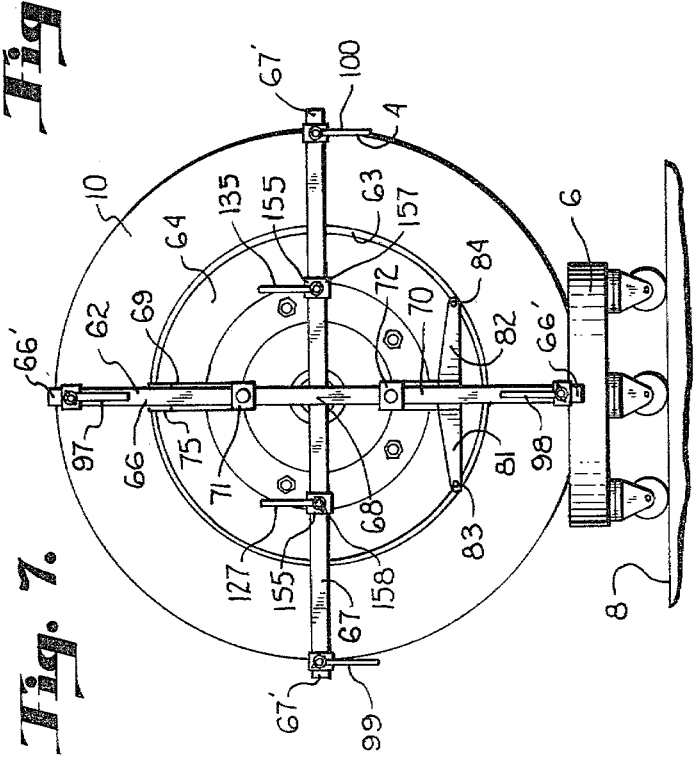

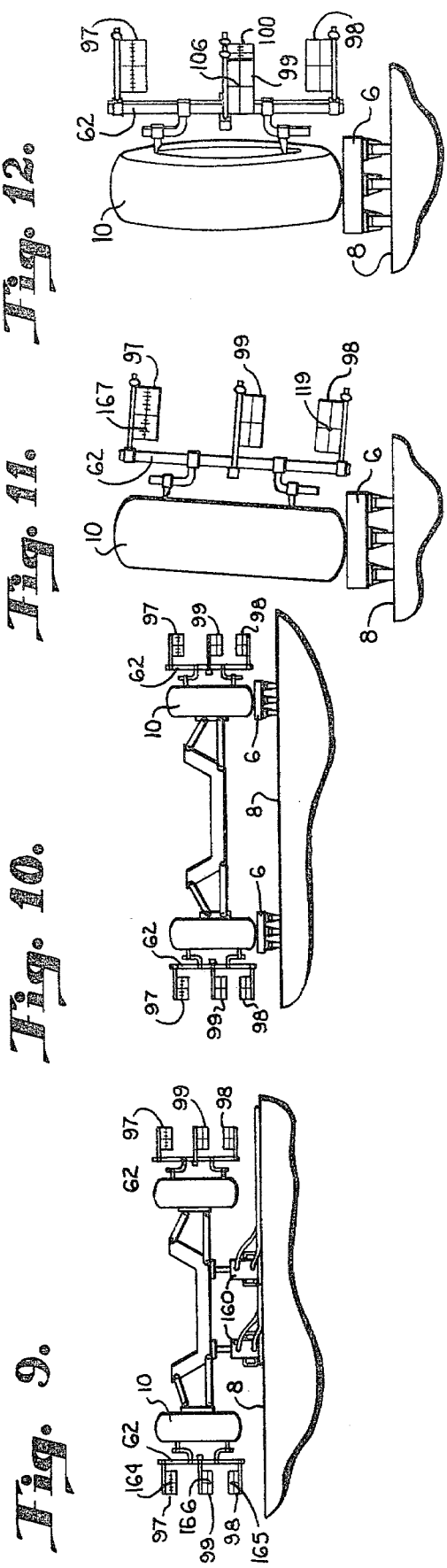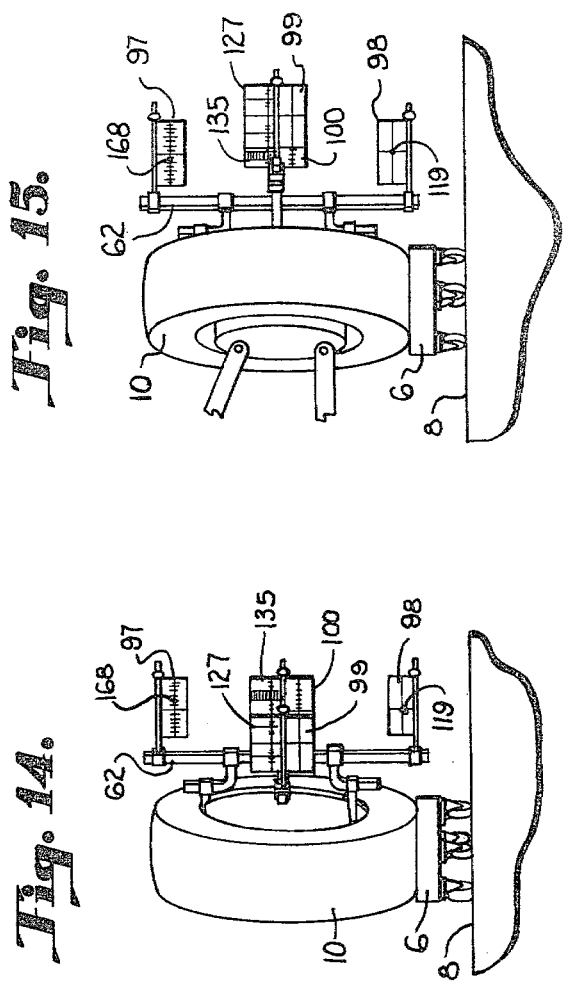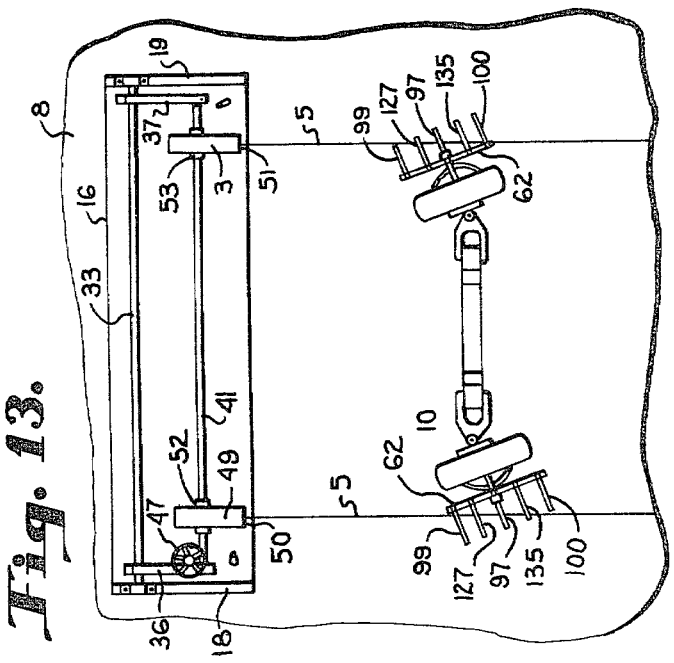

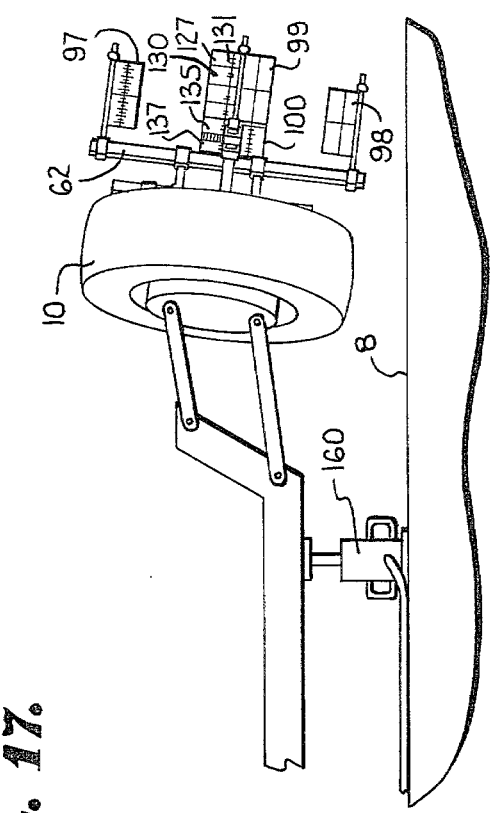
Fig. 17.
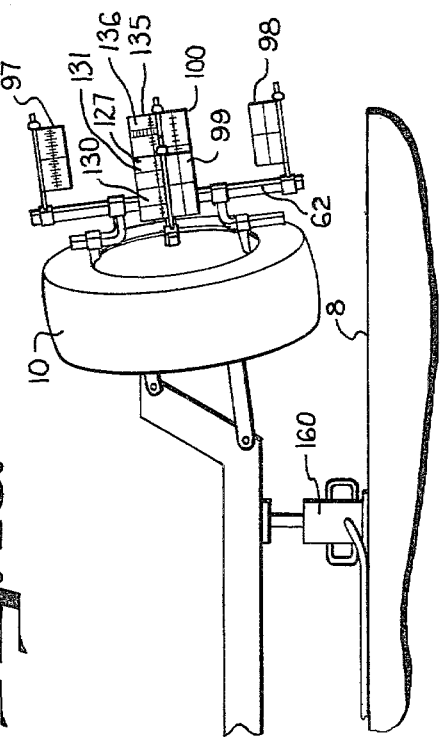
Fig. 16.
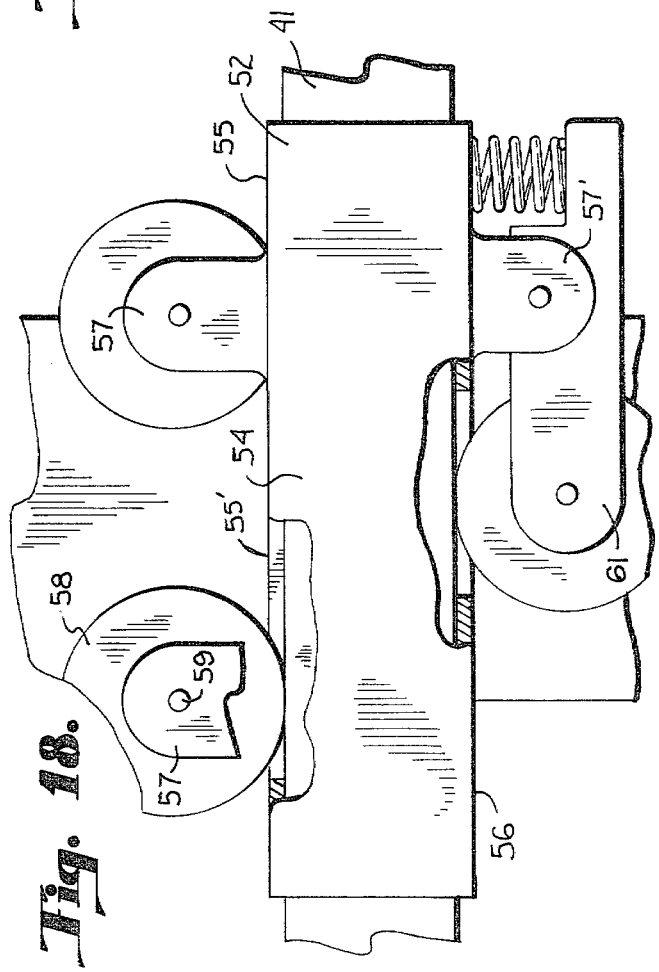
Fig. 19.
Fig. 18.

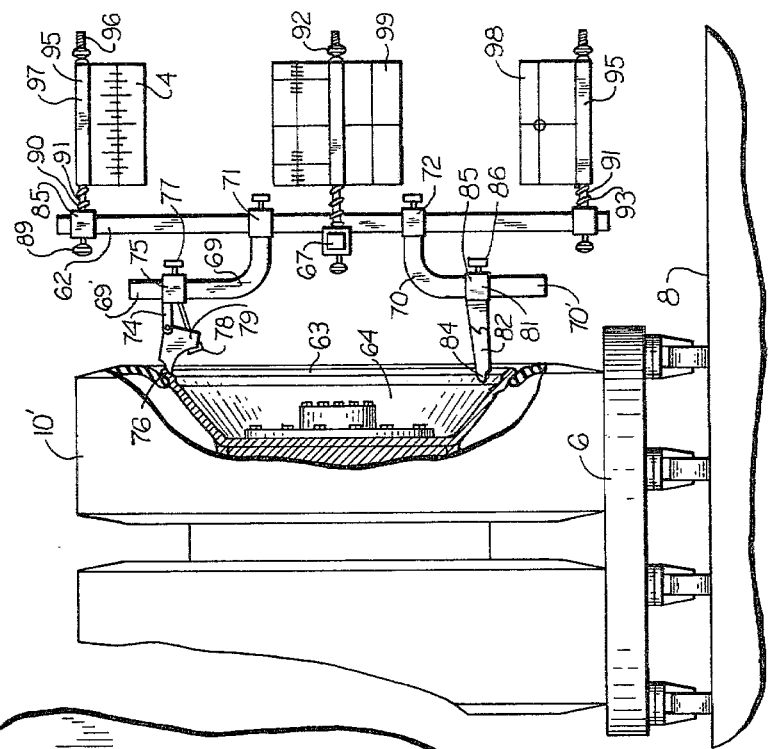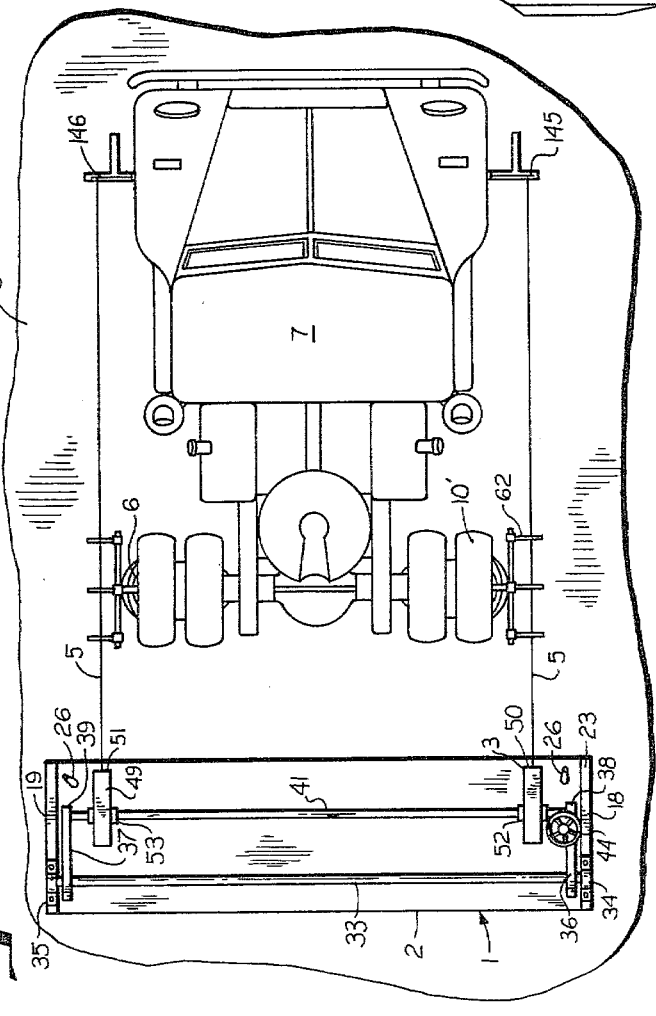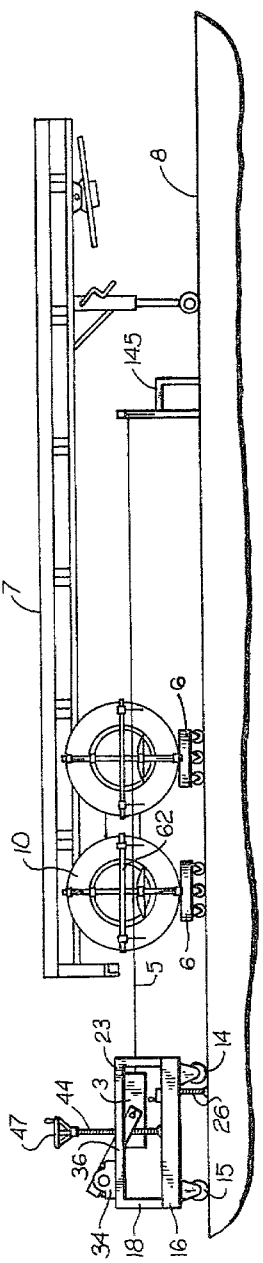

LINE OF SIGHT WHEEL ALIGNMENT APPARATUS FOR VEHICLES

This is a continuation-in-part of application Ser. No. 940,823, Sept. 8, 1978, now abandoned.

This invention relates to alignment apparatus for indicating the angular relationships of vehicle wheels such as tracking, caster, camber, toe-in, and steering axis cant and, in particular, relates to an apparatus employing a line of sight alignment instrument.

Vehicles, such as automobiles, trucks, truck tractors and trailers typically require periodic maintenence checks and adjustment of alignment. Normally, alignment is correctly set when the vehicle is manufactured, however, after extensive use, damage to the wheels or axle assemblies or hard usage, such as occurs by hitting curbs, potholes and the like, misalignment may occur and the vehicle will encounter handling difficulties, a poor ride and excessive tire wear characteristics related to the incorrect alignment. Such handling difficulties include vehicle wandering and pulling to one side, which requires constant and annoying steering wheel correction by the driver, hard steering, front tire shimmy and, referring to rear dual wheels of truck tractors, trailers and the like, a tendency toward oversteering or understeering and improper tracking.

With respect to vehicle front wheels, front end alignment centers on the precise geometric relationship of a number of parts, even when they are changing relative positions, which provide front wheel stability and control. These geometric angles include toe-in/toe-out, camber, caster, and steering axis cant (sometimes termed king pin inclination).

Camber is the angle which the center line of the wheel makes with a vertical axis. The top of the wheel tilts away from the car so that the tire is inclined vertically whereby the wheel becomes vertically straight when the weight of the vehicle is on the wheel. Closely related to camber is toe, which is a horizontal measurement of the amount that both wheels are closer together at the front than at the rear of the wheel when toe-in is used as an example. Both camber and toe are related to vehicle weight on the wheel and to compression forces occuring on the steering linkage with forward speed. Normally, the greater the camber, the greater is the toe-in.

Caster is the cant of the upper ball joint toward the rear of the vehicle. Caster moves the pivot point of the wheel forward of the tire's center and provides yet another type of directional stability by causing a drag on the bottom of the wheel when it turns, thereby resisting the turn and tending to hold the steering wheel steady in the direction of straight ahead vehicle movement. It will be appreciated that too slight a caster angle will cause the wheels to wander or weave at high speed and steer erratically when the brakes are applied. In contrast, too great a caster angle encourages hard steering and low speed shimmy. Additionally, placing the weight of the car directly over the pivot point allows the easiest possible steering and removes load from the outside wheel race bearings.

Steering axis cant, or king pin inclination in vehicles having a kingpin, is the angle from the vertical at which the steering knuckle is attached to the upper and lower ball joints. The canted steering knuckle controls wheel directional stability by forcing the wheel to lift the chassis in order to turn from a straight ahead direction. As the steering arm releases its force on the wheel, the wheel automatically tends to return to its straight ahead position under the downward force of the chassis weight.

Additionally, the vehicle must track properly to make for easier steering and prevent excessive tire wear. Tracking is the condition whereby the rear wheels of the car follow the front wheels in parallel relation.

The above alignment determinations apply to steerable front wheels. With respect to non-steerable rear wheels, such as the rear dual wheels of truck tractors, trailers and the like, tracking, toe and camber are the alignment factors which may be out of specification and must be checked. Additionally, the wheel axle may not be evenly centered relative to the vehicle body and may be offset, thereby causing a shorter radius of turn in one direction than another and leading to tracking and handling difficulties.

The present invention provides means and a method of use thereof whereby all of the above alignment checks can be accurately accomplished.

The principal objects of the present invention are: to provide a wheel alignment apparatus utilizing a minimum of components; to provide a wheel alignment apparatus employing an accurate sighting means for determining angular relationships; to provide a wheel alignment apparatus using scaled targets which are easy to read and located for the convenience of the operator; to provide a wheel alignment apparatus which is mobile and can be easily moved into and out of operational position; to provide a wheel alignment apparatus which is capable of a high degree of accuracy; to provide a wheel alignment apparatus in which certain components thereof may be conveniently stored after use in a relatively small area; to provide a wheel alignment apparatus for checking tracking, caster, camber, toe-in and steering axis cant; to provide such a wheel alignment apparatus which a method of use therefor is easily and quickly learned by laymen; to provide a method for the use of the wheel alignment apparatus which is relatively easy and quickly accomplished whereby an operator may align the vehicle in a relatively short period of time; to provide such an alignment apparatus utilizing laser beams wherein the lasers are adjustably and movably mounted for accurate positioning relative to a vehicle and targets located relative thereto for alignment checks; to provide such an alignment apparatus usable on garage floors and the like whereby special platforms and pits are not necessary; to provide such an alignment apparatus wherein laser support structure permits variation of spacing, elevation and tilt to accommodate different size and types of vehicles; to provide such an alignment apparatus with scaled targets and mountings which are adjustable for accommodating different wheel and tire sizes for accurate checking of substantially all vehicles; and to provide a wheel alignment apparatus which is relatively inexpensive, sturdy and efficient in use and in which a method for use thereof is simply and easily accomplished.

Other objects and advantages of this invention will become apparent from the following description taken in connection with the accompanying drawings wherein are set forth, by way of illustration and example, certain embodiments of this invention.

FIG. 1 is a top plan view of a wheel alignment apparatus embodying the present invention and shown in connection with an automotive vehicle.

FIG. 2 is a side elevational view of the wheel alignment apparatus with target components thereof mounted upon front wheel rims of the vehicle.

FIG. 3 is a diagrammatic, fragmentary, elevational view of components of the wheel alignment apparatus positioned adjacent rear wheels of the vehicle.

FIG. 4 is a front elevational view of sighting instruments and support structure therefor comprising portions of the alignment apparatus.

FIG. 5 is a side elevational view of the sighting instrument and support structure therefor.

FIG. 6 is a fragmentary, rear elevational view of the support structure for the sighting instruments and showing details of an elevating mechanism therefor.

FIG. 7 is a side elevational view of a wheel engaging and target support structure having sighting targets mounted thereon.

FIG. 8 is a front elevational view of the wheel engaging and target support structure and having portions broken away to show engagement thereof with the wheel rim.

FIG. 9 is a diagrammatic, front elevational view of the front wheels of the vehicle showing the wheels lifted from ground support and with wheel engaging and target support structures mounted thereon.

FIG. 10 is a diagrammatic front elevational view of the vehicle front wheels in ground supporting contact and with target structures mounted thereon.

FIG. 11 is a diagrammatic elevational view of a front wheel with targets mounted thereon and shown with regard to the measurement of camber, the angle of which is exaggerated for purposes of illustration.

FIG. 12 is a diagrammatic, front elevational view illustrating toe-in measurement, the angle of which is exaggerated for purposes of illustration.

FIG. 13 is a diagrammatic, plan view of a vehicle axle and front wheels thereof and illustrating caster measurement.

FIG. 14 is a diagrammatic, front elevational view depicting a measurement of caster in one turning direction of the wheel.

FIG. 15 is a diagrammatic, front elevational view showing caster measurement in the opposite turning direction to that shown in FIG. 14.

FIG. 16 is a diagrammatic, front elevational view showing the vehicle front wheel lifted from ground contact and turned in one direction to provide a measurement for determining steering axis cant.

FIG. 17 is a diagrammatic, front elevational view of the vehicle front wheel lifted from ground contact and turned in the opposite direction to that shown in FIG. 15 to provide a second measurement for steering axis cant and which, in combination with the measurement provided in FIG. 16, corresponds to the angle of steering axis cant.

FIG. 18 is an enlarged, fragmentary view of a sighting instrument and movable support structure therefor.

FIG. 19 is a perspective view of a modified form of sighting instrument support structure and showing a cabinet enclosing same and providing storage space for tools and components associated with the wheel alignment apparatus.

FIG. 28 is a plan view of the wheel alignment apparatus shown in connection with dual rear wheels of a truck tractor.

FIG. 29 is a side elevational view of the wheel alignment apparatus with target components thereof mounted upon dual rear wheels of a truck trailer.

FIG. 30 is a front elevational view of the wheel engaging and target support structure and employed in engagement with an outer wheel of dual rear wheels of a truck trailer.

Figure 21:
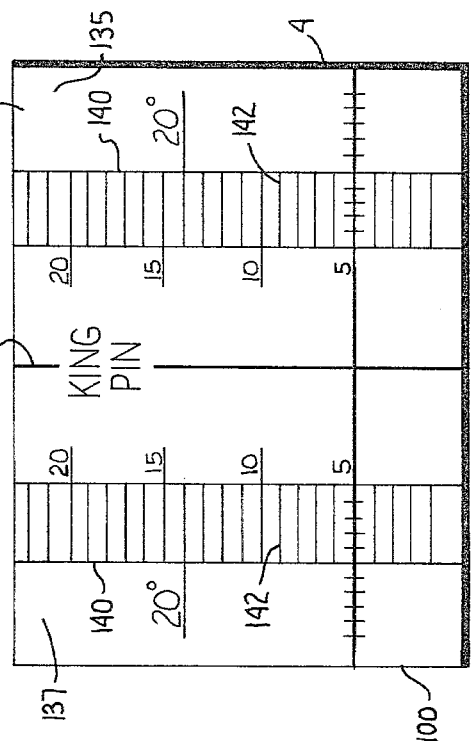
FIG. 21 is an elevational view of a rear target used in the measurement of toe-in and toe-out.

As required, detailed embodiments of the present invention are disclosed herein, however, it is to be understood that the disclosed embodiments are merely exemplary of the invention which may be embodied in various forms, therefore, specific structural and functional details as disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally indicates a line of sight wheel alignment apparatus embodying the present invention. The apparatus 1 includes a movable support means 2 with sighting instruments 3 mounted thereon from which lines of sight 5 are respectively directed at discrete indicia or scale marks on targets 4 mounted upon the wheels 10 of a vehicle.

In the illustrated example, FIGS. 1-17, a vehicle 7, such as a truck or car of which the wheel alignment is to be checked is positioned so that access is gained to the underside thereof, as by raising on roller plates 6 movable on the flat surface of the garage floor 8, however, a ramp or other vehicle elevating and supporting structure may be used in those situations where a permanent or semi-permanent installation is desired. It will be appreciated that the movable sighting instrument support means 2 and the roller plates 6 permit vehicle alignment to be conducted on a bare base or floor, that is, a floor having no fixed or permanent mountings or structures. Therefore, the alignment apparatus 1 requires a minimum of floor space and is particularly suited for frame and body shops, service stations, or the like where there is little or no space available for permanent installations.

The support means 2 rests upon the garage floor 8, FIGS. 4 and 5 and preferably has a frame or base 16 having sets of front and rear casters or wheels 14 and 15 mounted on the underside thereof for movement on the floor 8. Upright mounts 18 and 19 are secured to opposite ends of the base 16 and have respective front and rear vertical legs 21 and 22 connected by a top bar or arm 23 extending therebetween.

The elongate frame or base 16 is movable upon the floor 8 to locate, or "square", the longitudinal axis of the support means 2 transversely to the longitudinal axis of the vehicle 7. Once the frame or base 16 has been properly positioned, as described below, the same is retained in position by adjustable jack screws 26 adjacent each front wheel 14 and having a lower floor engaging pad 27 and an upper crank arm 28.

An elongate back beam 33 extends between the mounts 18 and 19 and has opposite ends connected to the respective arms 23 by journal boxes 34 and 35 with interior, self-aligning bearings permitting rotation of the back beam 33.

Transverse arms 36 and 37 are rigidly secured to the back beam 33 spaced from and adjacent the journal boxes 34 and 35. Respective front ends 38 and 39 thereof are split inwardly to bearing surfaces 40, FIG. 5, for receiving and rotatably supporting an elongate sighting instrument supporting front beam 41. Fasteners 32, such as bolts, extend through the ends 38 and 39 and cause the same to clamp around ends 43 of the beam 41 for preventing excessive free rotation. Means for rotating the back beam 33 and thereby moving the front beam 41 upwardly or downwardly relative to the back beam 33 are included and, in the illustrated example, FIG. 6 the arm 36 has a mid portion 42 connected to a jack screw 44 via a swivel connector 45 on the arm 42. A journal 46 affixed to the base 16 mounts the bottom end of the jack screw 44 thereto. A hand wheel 47 facilitates rotation of the jack screw 44 for moving the front beam 41 upwardly and downwardly.

The front beam 41 supports the sighting instruments 3 such as telescopes, light beam projectors and the like. In the illustrated example, the sighting instruments 3 comprise low power lasers 50 and 51 which project respective lines of sight 5 beams of coherent, collimated radiation capable of great accuracy for alignment. The sighting instruments 3, exemplified as by the lasers 50 and 51, are preferably sufficiently sensitive to minor misalignment angles to permit relatively precise alignment of the subject vehicle wheel 10. The sighting instruments 3 are preferably sturdily mounted to supports and, in the illustrated example, the lasers 50 and 51 are mounted within respective housings 49 rigidly connected to sleeves 52 and 53 selectively movable along the front beam 41.

Preferably, the front beam 41 is transversely polygonal, such as square or rectangular and the sleeves 52 and 53 do not rotate relative thereto. In the illustrated example, the front beam 41 has cylindrical ends 43 which are rotatable within the arm remote ends 38 and 39 and thereby enable both lasers 50 and 51 to rotate upwardly and downwardly together and move lines of sight 5 respectively projected therefrom in parallel vertical planes. The sleeves 52 and 53, FIG. 18, each have a rectangular body portion 54 with front and rear sides 55 and 56 spaced from the front and rear surfaces of the beam 41. Ears 57 project outwardly from the front side 55 and wheels 58 are mounted thereto, as by a pin 59. The front wheels 58 extend through an opening 55' in the front side 55 for rolling engagement with the beam 41. A rear tension wheel 60 is mounted to the rear side 56 by a lever arm 61 pivotally connected to the rear side 56 by an ear 57' and having a spring 61' held in compression at an end of the arm 61. The rear wheel 60 contacts the beam 41 through an opening 56' in the rear side 56 of the body portion 54 and permits rolling movement of the respective sleeves 52 and 53 on the beam 41. The upper side of each body portion 54 slides on the beam 41 and frictionally inhibits free movement thereon while the rear tension wheels 60 inhibit wobbling movement or misalignment of the sleeves 53 and 52 thereon. Thus, the sleeves 52 and 53 and thereby the lasers 50 and 51 are selectively movable on the beam 41 and are maintained in straight ahead position.

The sighting instruments 3, such as the lasers 50 and 51, project respective lines of sight 5 toward targets 4 located on wheels 10 of the vehicle 7. In the illustrated example, FIGS. 7 and 8, an adjustable target supporting and wheel engaging structure 62 is mounted to the inner surface of the tire bead flange 63 of the wheel rim 64. The wheel engaging structure 62 includes a vertical shaft 66, such as formed of rectangular metal tubing, and a cross bar 67 rigidly and normally connected thereto as by welding, at a structure center 68. Movable up and down on the vertical shaft 66 are a pair of upper and lower vertically curved legs 69 and 70 having respective thumbscrew secured sleeve ends 71 and 72 selectively slidable upwardly and downwardly on the vertical shaft 66 relative to the center 68 to coaxially align the center 68 with the wheel hub center or vehicle axle. The upper and lower legs 69 and 70 have respective straight portions 69' and 70' extending parallel to the vertical shaft 66 and spaced laterally therefrom toward the rim 64. An upper rim engaging post 74 has a sleeve end 75 slidably connecting the post 74 to the upper leg straight portion 69'. A hinged tip end 76 of the post 74 engages the interior surface of the tire bead flange 63 and is tightly maintained in engagement by adjustment of a primary thumb screw 77 extended through the sleeve end 75 and a secondary thumb screw 78 extended through a lever arm portion 79 of the hinged tip end 76 and contacting the sleeve end 75.

Extending outwardly from the lower leg 70 and inwardly toward the wheel rim 64 are a pair of diverging, spaced lower rim engaging posts 81 and 82 which have short, threaded, shaft ends 83 and 84 extended horizontally and laterally therefrom for engaging the tire bead flange 63. The posts 81 and 82 are connected to a central sleeve 85 through which is extended a thumb screw 86 for selectively positioning the sleeve 85 along the straight portion 70'.

The targets 4 are mounted upon the wheel engaging structure 62 and extend outwardly and horizontally from portions of the vertical shaft 66 and the cross bar 67. It will be appreciated that the vertical shaft 66 and the horizontal cross bar 67 are of the same length and that certain targets 4, described below, are located at cardinal points, that is, along the horizontal and vertical axes thereof, relative to the wheel 10, such as top, bottom, front and rear with 90° spacing between each target 4. Further, placement of the center 68 of the wheel engaging structure 62 is adjusted by the use of the various sleeves and thumb screws and, when correctly adjusted, the center 68 should be aligned coaxially with the center of the wheel axle shaft or hub cap of the vehicle to space certain targets 4 equidistantly from the center 68 and at 90° angles from each other.

The targets 4 are preferably laterally adjustable toward and away from a respective vertical shaft 66 and cross bar 67 so as to be the same distance from the wheel rim 64. In the illustrated example, the targets 4 are mounted upon shafts 91 having mid portions 94 which are square in cross section and which have connector ends 90 rigidly mounted on sleeves 88 movable along the vertical shaft 66 and the cross bar 67 and fixed in position therealong by thumbscrews 89. Flanged nuts 92 on threaded free ends 96 of the bolt shafts 91 facilitate manual adjustment of the targets 4 inwardly and outwardly relative to the wheel rim 64. Coil springs 93 are sleeved on the shafts 91 between the sleeve 88 and ends of target tubular members 95 sleeved on the shafts 91 and urge the targets 4 laterally away from a respective sleeve 88.

When the wheel engaging and target supporting structure 62 is mounted to the wheel rim 64, certain targets 4 are spaced circumferentially and laterally of the wheel axle and cardinally located at opposite vertical and horizontal positions around the rim 64; these respective target positions are hereafter designated as upper and lower targets 97 and 98 and front and rear targets 99 and 100. Each of the targets 4 have indicia thereon providing scale measurements described below, for determining alignment angles of the front wheels 10. The targets 4 are preferably comprised of a sturdy, shatter resistant transparent material, such as plexiglass, which permits a line of sight 5 from a sighting instrument 3 to pass therethrough, as for example through the front target 99 to the rear target 100 and thereby visibly impinge upon a discrete scale mark thereof as described below.

Figure 20:
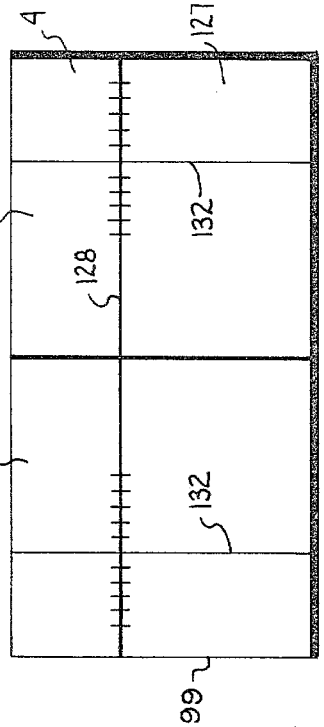
FIG. 20 is an elevational view of a front target used in the measurement of toe-in and toe-out.

The targets 4 are individually illustrated in FIGS. 20 through 26. FIGS. 20 and 21 show targets which are used to measure horizontal angular relationships, such as toe-in or toe-out, and are consequently mounted upon the opposite ends 67' of the cross bar 67. A front target 99 has vertical and horizontal lines 104 and 105 which cross at 106 and thereby form a central aiming point for impingement of a line of sight 5 thereon. The transparency of the front target 99 permits the line of sight 5 to pass therethrough and impinge upon the rear target 100, FIG. 21 which may have a frosted or lightly textured surface to better permit seeing the point of impingement of the line of sight 5 thereon, as for example, a laser light beam from the lasers 50 and 51.

The rear target 100 includes an inch scale 108 showing up to two inches of toe-out or toe-in and a metric scale 109 with up to 4½ cm of toe-out or toe-in and which are separated by a horizontal line 110. A vertical zero line 111 divides a toe-out side 113 and a toe-in side 114 of the target 100.

Figure 27:
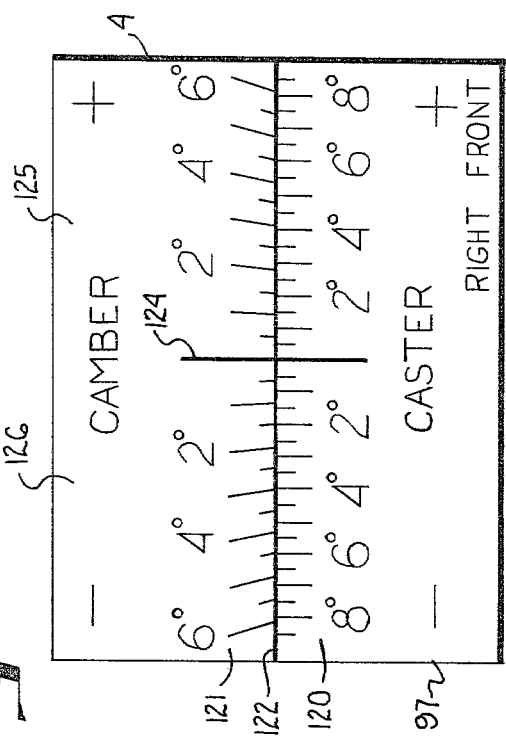
FIG. 27 is an elevational view of an upper, or second target used in the determination of camber and caster of the vehicle right wheel.
Figure 26:
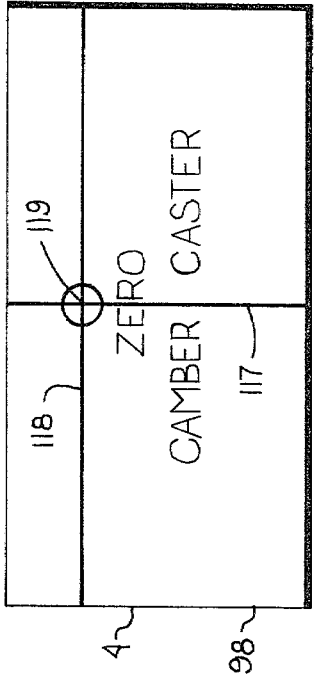
FIG. 26 is an elevational view of a lower, or first target used in the determination of camber and caster of the vehicle right wheel.
Figure 25:
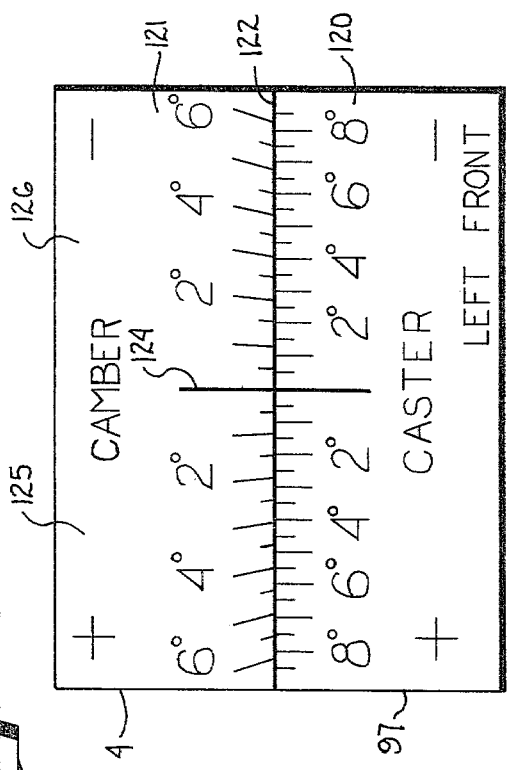
FIG. 25 is an elevational view of an upper, or second target used in the determination of camber and caster of the vehicle left wheel.
Figure 24:
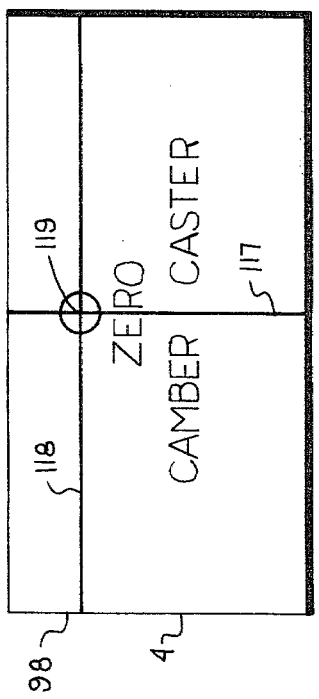
FIG. 24 is an elevational view of a lower, or first target used in the determination of camber and caster of the vehicle left wheel.

FIGS. 25 through 27 show left and right sets of targets 4 which are used to measure vertical angular relationships, such as camber, and measurements which are predominately vertical angular relationships, such as caster. The lower targets 98 for the vehicle left and right wheels 10, FIGS. 24 and 26 respectively are preferably identical and have horizontal and vertical lines 117 and 118 which cross at point 119 and provide an aiming point for the line of sight 5. A left wheel upper target 97, FIG. 25 and a right wheel upper target 97, FIG. 27 each have a lower caster scale 120 showing caster in degrees from zero to eight and an upper camber scale 121 showing camber in degrees from zero to six and separated from the caster scale 120 by a horizontal line 122. A vertical zero line 124 divides positive and negative sides 125 and 126 of the camber and caster scales 120 and 121. The positive and negative sides 125 and 126 accord with the wheels 10 as the alignment apparatus operator would look at them from the sighting instruments 3 and, for example, a positive camber measurement means that the bottom of the wheel 10 tilts inwardly toward the longitudinal axis, or center of the vehicle 7.

Figure 23:
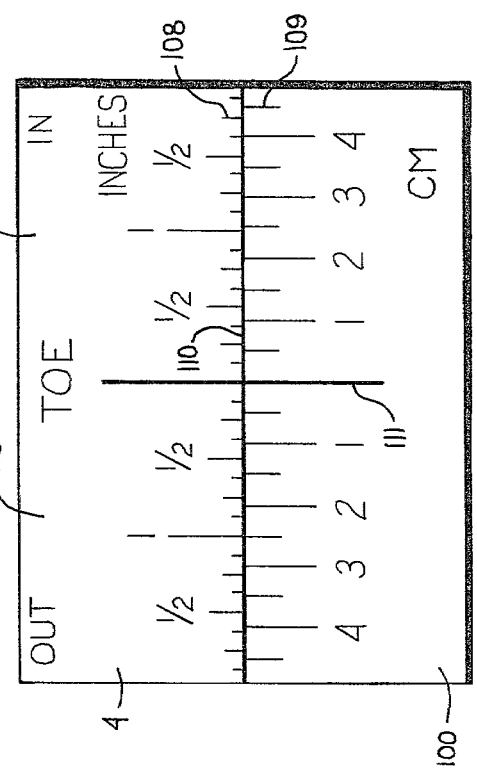
FIG. 23 is an elevational view of a rear target used in the measurement of king pin inclination or steering axis cant.
Figure 22:
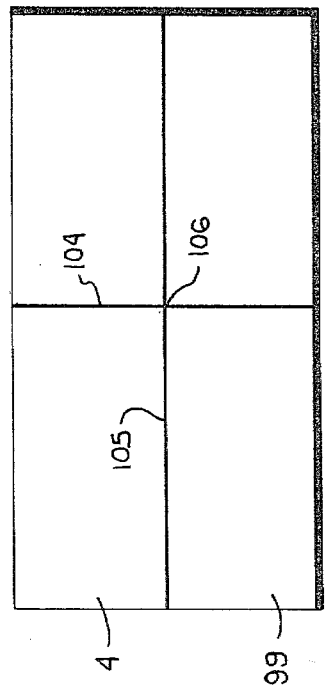
FIG. 22 is an elevational view of a front target used in the measurement of king pin inclination or steering axis cant.

FIGS. 22 and 23 show targets 4 which are used to measure the predominately horizontal angular relationship of king pin inclination or steering axis cant and which are positioned along the cross bar 67 and preferably located radially inwardly of the front and rear targets 99 and 100. A front steering axis cant target 127, FIG. 22, has a horizontal line 128 extending thereacross and a central vertical line 129 dividing the target 127 into equal left turn and right turn aiming portions 130 and 131 for receiving the line of sight 5 as the forward portion of the wheel 10 moves outwardly and inwardly about the vehicle turning axis. Each portion 130 and 131 has a vertical line 132 for directing a line of sight 5 therethrough when the wheel 10 is turned 20°.

A rear steering axis cant target 135, FIG. 23, has left turn and right turn aimimg portions 136 and 137 oppositely placed of the front steering axis cant target 127 left turn and right turn aiming portions 130 and 131 and positioned for receiving a line of sight 5 as the rearward portion of the wheel 10 moves outwardly and inwardly. The left turn and right turn aiming portions 136 and 137 are separated by a vertical dividing line 139 and each have a vertical line 140 for indicating 20° of turn in the according direction. A vertical scale 142 in each of the respective portions 136 and 137 shows the steering axis cant in degrees from five to twenty for the direction of turn.

The steering axis cant targets 127 and 135 are each located on the cross bar 67 between the ends 67' and the center 68. Clips or sleeves 155 are open on the rear side thereof for outward detachment from the cross bar 67 and are mounted to the targets 127 and 135 as described in connection with the sleeves 88 and the targets 97 through 100. To maintain a set relationship to the center 68, the clips or sleeves 155 are preferably connectible to the cross bar 67 only at 157 and 158 and have an interior pin insertable within a bore (not shown) in the cross bar 67, the distance of the bore from the center 68 being known and set to accord with the degree scales 142 of the rear steering axis cant target 135. The steering axis cant targets 127 and 135 extend upwardly to not interfere with a line of sight 5 directed toward the front and rear targets 99 and 100 during determination of toe-in and toe-out. The steering axis cant targets 127 and 135 are located at cardinal positions, that is, along the horizontal cross bar 67, radially inward of the front and rear targets 99 and 100.

Additionally, indicia bearing left and right wheel targets 145 and 146 are positioned adjoining left and right tires 147 and 148, FIG. 3, spaced from the wheels 10, such as rear wheels, or second wheels longitudinally spaced from the wheels to be aligned, during an initial or vehicle positioning phase of alignment. In the illustrated example, each target 145 and 146 includes an upright standard 150 for positioning the target by the wheel and having supportive feet 151 spaced whereby the targets 145 and 145 abut the rear tires 147 and 148 and extend normally therefrom. Preferably, each target 145 and 146 has vertical scale lines spaced in centimeters or inches, and with numbers thereof progressing serially toward outside edges 152 thereof.

Alternatively, the wheel engaging and target supporting structures 62 can be connected to wheels 10 of a truck tractor, trailer or the like vehicle 7 such as shown in FIGS. 28 and 29 for aligning the non-steering, normally rearward positioned vehicle wheels. When the rear wheels are dual, such as shown in FIG. 30, the wheel engaging and target supporting structures 62 are respectively connected to an outer wheel 10' of the dual wheels.

For ease of performing alignment checks and correcting misalignment conditions, the vehicle 7 is preferably positioned with the wheels 10 to be aligned as close as possible to the alignment apparatus 1; when front wheels are to be aligned, the vehicle is headed toward the alignment apparatus and when rear wheels are to be aligned, the vehicle is backed toward the alignment apparatus 1.

To use the alignment apparatus 1 the vehicle 7 is lifted, as by power jacks 160 and the wheels 10, and preferably the wheels 145 and 146 are positioned atop the roller plates 6. The vehicle 7 is aligned by the driver as much as possible transverse to the front beam 41.

When aligning vehicle front wheels, as is conventional, the vehicle front end is checked for worn or loose fitting parts which must be replaced before alignment. The mechanic uses a jack to raise the front wheels above the roller plates 6 and shakes them both horizontally and vertically to detect any looseness. The mechanic spins the wheels to test for deteriorated bearings. Shock absorbers are checked for proper snubbing action by lowering the wheels 10 to the roller plates 6 and bouncing the car up and down by hand. Frame damage which would alter tracking and turning characteristics is checked by measuring carefully between common points, such as from the rear edge of the a wheel rim to the rear edge of a rear wheel rim. A twisted or distorted chassis may make front end alignment difficult if not impossible. Additionally, the tires should be equally worn and be equally inflated for best alignment results.

Precise positioning of the vehicle 7 relative to the sighting instrument support means 2 is accomplished by placing the left and right wheel targets 145 and 146 against the wheels 147 and 148, such as the rear wheels, FIGS. 1 and 2, or the wheels farthest away from the alignment apparatus, FIGS. 27 and 28 so that they extend normally therefrom. Wheel engaging and target supporting structures 62 are connected to each of the wheels 10, as described in connection with FIGS. 7 and 8, so that the shaft 66 is vertical and the cross bar 67 is horizontal. A bubble level (not shown) may be used for proper positioning of the structure 62. Using a measuring tape or suitable rule, the targets 4 are adjusted toward or away from the vertical shaft 66 and the cross bar 67 so that they are laterally equidistant from the tire rim 64 and thereby aligned parallelly to the side of the wheel.

The sleeves 88 of the front and rear targets 99 and 100 are moved along the cross bar 67 until they are even with the margins of the wheel 10 so that the front and rear targets 99 and 100 provide a true measurement of toe-in and toe-out. Preferably, the sleeves 88 of the upper and lower targets 97 and 98 are not moved as the scales thereof are calibrated with respect to a set distance or radius between the targets 97 and 98 and the structure center 68. Accordingly, it is preferred that the upper target 97 be adjusted to extend downwardly and the lower target 98 adjusted to extend upwardly for equidistant spacing from the center 68.

Using a rule to measure the radius of the tire to the floor 8, the jack screw 44 is rotated to adjust the front beam 41 upwardly or downwardly until the lines of sight 5 of the sighting instruments 3, such as the lasers 50 and 51, are horizontally directed through the axle or hub center of the rim 64. The lasers 50 and 51 are selectively moved inwardly or outwardly on the front beam 41 until the lines of sight 5, such as laser light beams, extend parallel to the sides of the vehicle 7 and laterally equidistant from the front and rear wheels as determined by the left and right wheel targets 145 and 146 and means such as the front and rear targets 99 and 100 or a ruled card or plate (not shown) held manually against the front wheel 10. If the vehicle 7 is located properly with respect to the front beam 41, the lines of sight will impinge at points 162 and 163 on the left and right wheel targets 145 and 146 and equidistantly from the outside edges 152. If the lines of sight 5 are not parallel to the vehicle sides, the sighting instrument support means 2 is moved relative to the vehicle 7 until the lines of sight 5 become parallel thereto and then the floor engaging jack screws 26 are set to maintain the elongate base 16 in fixed position. Additionally, the wheels 10 may be found to be turned relative to the longitudinal axis of the vehicle 7, particularly when examining vehicle front wheels, FIGS. 1 and 2. This will be detected by comparing the position of impingement of the line of sight 5 on the rear targets 100 relative to the front targets 99 for deviation, or difference of the scale markings. Rotation of the steering wheel may be required to move the wheels 10 to a straight ahead position.

A twisted or distorted chassis, which would affect the tracking characteristics of the vehicle, will become apparent during this initial calibration and "setting-up" phase. Small deviations may be acceptable but certain conditions may require frame straightening before alignment can be accurately accomplished.

After the front beam 41 is "squared", or aligned normally to the wheels 10 and the tires 104 and 105, each of the front wheels 10 are checked for both lateral run-out; i.e., misalignment in a plane perpendicular to the center axis and radial run-out; i.e., misalignment or eccentricity in the center axis. In this procedure, the wheels 10 are raised from contact with the roller plates 6 by pneumatic or hydraulic power jacks 160 so that the wheels 10 are substantially vertical, FIG. 9. The front beam 41 is adjusted either upwardly or downwardly until the line of sight 5 from the sighting instrument 3 extends horizontally through the vehicle wheel center or axle. Next, the line of sight 5 is rotated in a vertical plane toward either the upper target 97 or the lower target 98 to check for proper camber or vertical run-out. The impingement of the line of sight 5, such as the laser beam, with a scale mark on the target 97 or 98, as at point 164 is noted by marking with a grease pencil, recording, or other means. Next, the wheel is rotated 180 degrees and the impingement of the line of sight 5, as at point 165, noted upon the opposite target now in the line of sight 5. The point of impingement of the line of sight 5 should be at the same lateral scale mark on both targets. If there is deviation from proper vertical run-out, suspension parts, such as the upper control arm, should be adjusted until the points 164 and 165 lie in the same vertical plane.

Next, horizontal or toe-in run-out checked by adjusting the front beam 41 until the line of sight 5 passes through the horizontal front and rear targets 99 and 100. Horizontal run-out is checked by noting the point of line of sight impingement upon the front target 99 as at point 166 and the reciprocal rear target 100. The point of impingement upon the rear target 100 should be at the same lateral scale marking as on the front target 99. If there is deviation, suspension parts, such as the tire rod, should be adjusted. Run-out checks are now complete and accordingly, the wheel, when raised in the air and spun, should not wobble on its axis.

The wheels 10 are then lowered onto the roller plates 6, FIG. 10, for checking camber, illustrated in an exaggerated angle thereof in FIG. 11 for purposes of illustration. First, the front beam 41 and the sighting instruments 3 are adjusted so that the lines of sight 5 extend horizontally and through the cross point 119 of the bottom target 98. The line of sight 5 is then moved upwardly in a vertical plane to spot a point of impingement 167 on the camber scale marks of the upper target 97, indicating, for example, 2° of negative camber to the lower target 98. The deviation, or degree of vertical angle, appears as the difference from the vertical between the line of sight impingement points of the upper and lower targets 97 and 98 and the camber scale 121 provides a measurement corresponding to actual degrees of camber. Adjustment of the suspension and steering parts may be necessary to set in the manufacturer's specified camber angle.

Measurement of toe-in or toe-out, FIG. 12, is accomplished by procedures similar to camber measurement. Keeping the front beam 41 in the same position as above, the sighting instruments 3, such as the lasers 50 and 51 are located thereon to direct the lines of sight 5 through the cross point 106 of the front target 99. The line of sight 5 extends through the front target 99 and impinges the surface of the rear target 100 on either the toe-in side 114 or the toe-out side 113. As the front and rear targets 99 and 100 are adjacent the front wheel margins, the deviation, or degree of horizontal angle from straight ahead, indicated on the rear target 100 is a true toe-in or toe-out measurement. Here again, adjustment of the proper vehicle steering and suspension parts, such as the tie rod, may be required.

Next to be checked is caster, FIGS. 13-15, which is the cant of the upper ball joint toward the rear of the vehicle. Caster, like camber and toe-in, is measured with the weight of the vehicle upon the front wheels. First, using the degrees of turn scales of the front and rear steering axis cant targets 127 and 135 for example, the wheels 10 are turned 20 degrees either left or right from a straight ahead direction FIG. 13. The lasers 50 and 51 are adjusted to direct respective lines of sight 5 through cross points 119 of the lower targets 98 on the front wheels 10. The lines of sight 5 are flipped upwardly and a point of impingement 168, for example, upon each caster scale 120 of the upper targets 97 is noted, for example negative 2° in a wheel right turn, FIG. 14. This is one direction of the angular rotational deviation caused by the cant of the upper ball joints. The wheels 10 are then turned 40 degrees in the opposite direction or 20 degrees past the straight ahead position, FIG. 15 and using the same procedures as above, the angular rotational deviation is noted upon the caster scale 120 of the upper target 97, for example ¾ degree FIG. 15. The difference between the two measurements, for example 1¼ degrees, is the angle of caster of the wheel.

Steering axis cant, or kingpin inclination, is determined with the weight of the vehicle 7 off the wheels 10 and with the front end raised, as by the jacks 160, FIGS. 16 and 17. The vehicle brakes are applied and held down to prevent axial rotation of the wheels 10. Next, the front beam 41 is adjusted upwardly so that a line of sight 5 extends horizontally through the front and rear steering axis cant targets 127 and 135. The sighting instruments 3 are adjusted laterally to direct lines of sight 5 through the vertical lines 132 of respective left and right turn portions 130 and 131 of the front steering axis cant target 127 and toward the 20° turn lines 140 of left and right turn portions 136 and 137 of the rear steering axis cant target 135. The line of sight 5 will align with one of the vertical lines 132 and an opposite 20° turn line 140 when the wheel is turned 20° from straight ahead position in either direction.

Using the above method to determine degrees of turn, the wheels 10 are turned right 20 degrees FIG. 16 and the point of line of sight 5 impingement upon the vertical scale 142 of the right turn portion 137 of the rear steering axis cant target 135 noted, as for example 10°. The wheels 10 are turned left 40 degrees in the opposite direction, or 20 degrees past the straight ahead position, FIG. 17, and as determined the point of line of sight 5 impingement upon the vertical scale 142 of the left turn portion 136 of the rear steering axis cant target 135 noted, as for 8°. The angle of steering axis cant is then determined by the average of the right and left turn measurements, for example 9°.

When the alignment apparatus 1 is used to align the normally rear wheels, which may be dual, of truck tractors, trailers and the like, FIGS. 27, 28 and 29, the wheels 10 to be aligned are preferably positioned adjacent the alignment apparatus 1. The vehicle 7 is positioned, or "squared" relative to the alignment apparatus 1 as described above and during this phase, a bent frame or frame misalignment condition will be apparent. Alignment of rear wheels 10, FIGS. 27, 28 and 29 checks correct axle centering relative to the vehicle frame so that the axle does not extend further to one side of the vehicle than the other, correct tracking, and camber and toe.

The wheel engaging and target supporting structures 62 are connected to the wheels 10 to be aligned as described above and the vehicle 7 is centered with the aid of the wheel targets 145 and 146, also as described above.

The alignment measurements of tracking, camber and toe are accomplished as described above. If the measurements indicate an out-of-alignment condition then generally wrongfully bent axles must be brought back into specification by bending. For example, when a tag axle and wheel arrangement is employed, the differential housing of the tag axle differential is adjusted by bending or "straightening" the wrongfully bent condition.

Truck tractor rear wheels 10 normally have a slight toe out toward the front of the tractor although many tractors employ zero toe. Camber, when set on dual wheels 10', should also be slight, as for example, 0° to ½° of positive camber.

A modified form of elongate base 16 of the sighting instrument support 2 is shown in FIG. 19 whereby a cabinet 170 covers the base 16 and encloses the sight instruments 3 for providing a storage facility for the associated wheel engaging and target support structures 62 and the rear wheel targets 144 and 145. In the illustrated example, opposite sides 172 and 173 and a back 174 extend upwardly from margins of the base 16 and are covered by a top 175. Doors 177 and 178 are slidably mounted in a front opening 179 of the cabinet 170 and are movable thereacross to close off the cabinet 170 and secure materials and tools therein.

It will be apparent from the preceeding description that the wheel alignment apparatus of the present invention has features which enable it to be easily and quickly used by even a relatively inexperienced vehicle mechanic. Intensive training is not required to enable the operator to understand the theory and procedures of operation of the apparatus, thus offering relatively few opportunities for error. Further, relatively precise scale measurements are indicated by a well defined, narrow beam of light for a readily apparent visual display.

It is to be understood that while one form of this invention has been illustrated and described, it is not to be limited to this specific form or arrangement of parts herein described and shown, except insofar as such limitations are included in the following claims.

What is claimed and desired to secure by Letters Patent is:

1. Apparatus for checking wheel alignment of a wheeled vehicle comprising:
   (a) a base structure having a surface supporting a wheeled vehicle for alignment checks thereof;
   (b) target structure mountable on the wheels of a vehicle and having scaled targets located thereon in diametrically opposed relation and laterally outwardly of the wheels;
   (c) laterally spaced laser beam projecting members spaced longitudinally from and aligned with the target structure and spaced generally laterally from the longitudinal axis of the vehicle;
   (d) a support structure for said laser beam members having spaced apart standards and a shaft member extending therebetween; said shaft having spaced arms;
   (e) means rotatably mounting said spaced arms on said standards with said shaft radially outwardly from said rotatable mounting means;
   (f) means adjustably rotating said arms for raising and lowering said arms and the shaft thereon to vary the spacing from the base surface;
   (g) means pivotally mounting the shaft on the arms for adjusting the angle of said laser beams relative to the base surface;
   (h) means movably mounting the laser beam members on the shaft for adjusting the lateral spacing thereof; and
   (i) means for positioning the vehicle and laser beam members relative to the base surface for the laser beam members to project laser beams parallel to the longitudinal axis of said vehicle and spaced therefrom for impingement on the scaled targets on the respective wheels of said vehicle.

2. Apparatus for checking wheel alignment as set forth in claim 1 wherein:
   (a) said support structure includes a mobile frame having the spaced standards for selective movement over the base surface;
   (b) means carried by said mobile frame and selectively engageable with the base structure for retaining said mobile frame in a selected position relative to a vehicle to be checked;
   (c) target members associated with second wheels of a vehicle to be checked and adapted for impingement of the beams from the laser beam members for determining parallelism of said beams relative to the longitudinal center of the vehicle.

3. Apparatus for checking wheel alignment as set forth in claim 2 wherein:
   (a) said shaft member is non-circular;
   (b) said means movably mounting the laser beam members on said shaft member include sleeves, rollers and springs permitting movement along the shaft by application of force thereto and a gripping of the shaft member to retain said mounting means and laser beam member against movement along said shaft member.

4. A method for checking the alignment of the wheels of a wheeled vehicle, which comprises:
   (a) establishing a line of sight from a sighting instrument parallel to and laterally spaced from a longitudinal axis of a vehicle;
   (b) attaching a target structure to a wheel for rotation therewith and spaced longitudinally from and aligned with said sighting instrument, said target structure having a scaled target extending laterally of said wheel and spaced radially of the axle of said wheel generally at a circumferential margin thereof;
   (c) locating said target at a first cardinal axial point of said wheel;
   (d) directing said line of sight to impinge on said target at said first cardinal point;
   (e) locating said target at a second cardinal axial point of said wheel;
   (f) directing said line of sight to impinge on said target at said second cardinal point; and
   (g) measuring the lateral difference between the impingement of said line of sight on said target in said first cardinal position and in said second cardinal position, the difference measurement corresponding to a measurement of angular alignment of said wheel.

5. The method set forth in claim 4 including:
   (a) locating said target at a first upper vertical axis cardinal point of said wheel;
   (b) directing said line of sight at said target at said upper cardinal point;
   (c) locating said target at a second lower vertical axis cardinal point of said wheel; and
   (d) directing said line of sight at said target at said lower cardinal point, thereby checking vertical upper to lower alignment of said wheel.

6. The method set forth in claim 5 including:
   (a) directing said line of sight at a camber scale of said target.

7. The method set forth in claim 4 including:
   (a) locating said target at a first front horizontal axis cardinal point of said wheel;
   (b) directing said line of sight at said target at said front cardinal point;
   (c) locating said target at a second rear horizontal axis cardinal point of said wheel; and
   (d) directing said line of sight at said target at said rear cardinal point, thereby checking horizontal front to rear alignment of said wheel.

8. The method set forth in claim 7 including:
   (a) directing said line of sight at a toe scale of said target.

9. The method set forth in claim 7 including:
   (a) positioning said wheel a number of degrees of turn from straight ahead;
   (b) directing said line of sight to said target at said front and rear cardinal points;
   (c) measuring the lateral difference between the impingement of said line of sight on said target at said front cardinal point and at said rear cardinal point;

(d) positioning said wheel said number of degrees of turn in an opposite direction of turn from straight ahead;

(e) measuring the lateral difference between the impingement of said line of sight in said target at said front cardinal point and at said rear cardinal point; and (f) noting the difference of impingement of said line of sight between the wheel oppositely turned positions.

10. The method set forth in claim 9 including:

(a) directing said line of sight at a caster scale of said target.

11. The method set forth in claim 7 including:

(a) raising said wheel from contact with a supportive surface;

(b) turning said wheel in a first direction of turn from straight ahead;

(c) directing said line of sight to said target at said front and rear cardinal points; and (d) measuring the difference between the impingement of said line of sight on said target at said front cardinal point and at said rear cardinal point, said difference corresponding to the number of degrees of turn in said first direction of turn of said wheel from straight ahead.

12. The method set forth in claim 11 including:

(a) turning said wheel in a second and opposite direction of turn from straight ahead;

(b) directing said line of sight to said target at said front and rear cardinal points; and (c) measuring the difference between the impingement of said line of sight on said target at said front cardinal point and at said rear cardinal point, said difference corresponding to the number of degrees of turn in said second direction of turn of said wheel from straight ahead.

13. The method set forth in claim 12 including:

(a) directing said line of sight at a degrees of turn and a steering axis cant scale of said target.

14. The method set forth in claim 12 including:

(a) turning said wheel approximately 20 degrees in a first direction of turn from straight ahead;

(b) directing said line of sight to said target at said rear cardinal point;

(c) noting a first point of impingement of said line of sight on said steering axis cant scale of said target;

(d) turning said wheel approximately 20 degrees in a second direction of turn from straight ahead;

(e) directing said line of sight to said target at said rear cardinal point;

(f) noting a second point of impingement of said line of sight on said steering axis cant scale of said target; and (g) averaging said first and second points of impingement and deriving a value therefrom, the average value between said first and said second points of impingement corresponding to the cant of the vehicle steering axis.

15. The method set forth in claim 7 wherein:

(a) said vehicle wheel is a non-steerable wheel normally positioned at a rear end portion of said vehicle and vertical and horizontal alignment of said non-steerable wheel is checked.

16. A method for checking the alignment of the non-steerable, normally rearwardly positioned wheels of a vehicle comprising:

(a) establishing a line of sight from a sighting instrument positioned parallel to and laterally spaced from a longitudinal axis of a vehicle;

(b) attaching a target structure on a non-steerable, normally rearwardly positioned vehicle wheel, said target structure spaced longitudinally from and aligned with the sighting instrument and having a target situated laterally of said non-steerable wheel and spaced circumferentially of the axle of said non-steerable wheel;

(c) locating said target at a first upper vertical axis cardinal point of said non-steerable wheel;

(d) directing said line of sight to impinge on said target at said first upper vertical axis cardinal point;

(e) locating said target at a second lower vertical axis cardinal point of said non-steerable wheel;

(f) directing said line of sight to impinge on said target at said second lower vertical axis cardinal point, thereby checking vertical upper to lower camber alignment of said wheel;

(g) locating said target at a first front horizontal axis cardinal point of said non-steerable wheel;

(h) directing said line of sight to impinge on said target at said first front horizontal axis cardinal point;

(i) locating said target at a second rear horizontal axis cardinal point of said non-steerable wheel; and (j) directing said line of sight at said target at said second rear horizontal axis cardinal point, thereby checking horizontal front to rear toe alignment of said non-steerable wheel.

17. An apparatus for checking the alignment of the wheels of a wheeled vehicle, said apparatus comprising:

(a) a target structure having attachment means for removable connection to a wheel of a vehicle and rotation about the axle of said wheel;

(b) a scaled target connected to said target structure, said target being spaced radially from the axle of said wheel and extending laterally outward of said wheel; said target being rotatable with said target structure on said wheel to position said target at selected cardinal positions;

(c) a sighting instrument for directing a line of sight at said target and impinging said line of sight at a point on said target for indicating an alignment measurement of said wheel as read upon said target; and (d) a support structure locating said sighting instrument spaced from said target and establishing a line of sight spaced from the vehicle and parallel to and laterally spaced from a longitudinal axis of the vehicle;

(e) said sighting instrument including a laser device emitting said line of sight comprising a coherent, collimated light beam.

18. The apparatus set forth in claim 17 including:

(a) four said targets, said target structure positioning said targets respectively on horizontal and vertical axial cardinal points around said wheel.

19. The apparatus set forth in claim 18 wherein:

(a) said cardinal points include vertical upper and lower points and hoirzontal front and rear points.

20. The apparatus set forth in claim 18 wherein:

(a) said target structure includes elongate shafts mountable to said wheel in parallel orientation relative thereto, said targets being connected to said shafts and located thereon equidistantly from said wheel axle.

21. The apparatus set forth in claim 20 including:
(a) adjustable arms interconnecting said targets with said elongate shaft members for situating said targets laterally equidistant from said wheel and aligned in a vertical plane when said target structure is mounted upon said wheel.

22. The apparatus set forth in claim 17 wherein:
(a) said support structure includes means connecting said sighting instrument thereto and permitting movement of said line of sight in a vertical plane.

23. The apparatus set forth in claim 17 wherein:
(a) said support structure includes a standard with said sighting instruments located thereby a distance above a floor, said standard having horizontally adjustable means for moving said line of sight from said sighting instrument in a horizontal plane toward and away from the longitudinal axis of the vehicle.

24. The apparatus set forth in claim 23 wherein:
(a) said standard includes vertically adjustable means for varying said distance upwardly and downwardly between said sighting instrument and the floor.

25. An apparatus for checking the alignment of the wheels of a wheeled vehicle, said apparatus comprising:
(a) a target structure having attachment means for removable connection to a wheel of a vehicle and rotation about the axle of said wheel;
(b) a target having a scale thereon mounted on said target structure, said target being spaced radially from the axle of said wheel and extending laterally outward of said wheel when mounted on said wheel; said target being rotatable with said target structure on said wheel to position said target at selected cardinal positions;
(c) a laser sighting instrument for directing a line of sight comprising a coherent, collimated light beam at said target and impinging said line of sight at a point on said target for indicating an alignment measurement of said wheel as read upon said target; and
(d) a support structure locating said sighting instrument spaced from said target and establishing a line of sight spaced from the vehicle and parallel to and laterally spaced from a longitudinal axis of the vehicle.

26. An apparatus for checking the alignment of the wheels of a wheeled vehicle, said apparatus comprising:
(a) a target structure having attachment means for removable connection to a wheel of a vehicle and rotation about the axle of said wheel;
(b) four targets respectively having scales thereon and mounted on said target structure, said targets being spaced radially from the axle of said wheel and extending laterally outward of said wheel when mounted on said wheel; said targets being positioned at radially opposed upper and lower and front and rear cardinal positions, said targets being rotatable with said wheel about said axle;
(c) a laser sighting instrument for directing a line of sight comprising a coherent, collimated light beam at said targets and impinging said line of sight at a point on a selected target for indicating an alightment measurement of said wheel as read upon said target; and
(d) a support structure locating said instrument spaced from said target and establishing a line of sight spaced from the vehicle and parallel to and laterally spaced from a longitudinal axis of the vehicle.

27. An apparatus for checking the alignment of the wheels of a wheeled vehicle, said apparatus comprising:
(a) a target structure having attachment means for removable connection to a wheel of a vehicle and rotation about the axle of said wheel;
(b) four targets respectively having scales thereon and mounted on said target structure, said targets being spaced radially from the axle of said wheel and extending laterally outward of said wheel when mounted on said wheel; said targets being positioned at radially opposed upper and lower and front and rear cardinal positions, said targets being rotatable with said wheel about said axle;
(c) a sighting instrument for directing a line of sight at said targets and impinging said line of sight at a point on a selected target for indicating an alignment measurement of said wheel as read upon said target; and
(d) a support structure locating said instrument spaced from said target and establishing a line of sight spaced from the vehicle and parallel to and laterally spaced from a longitudinal axis of the vehicle.

28. A method for checking the alignment of the wheels of a wheeled vehicle comprising:
(a) establishing a line of sight from a sighting instrument positioned parallel to and laterally spaced from a longitudinal axis of a vehicle;
(b) mounting a target structure on a wheel, said target structure spaced longitudinally from and aligned with the sighting instrument and having upper, lower, front and rear targets situated laterally of said wheel and spaced circumferentially of the axle of said wheel;
(c) locating said upper target at a first upper vertical axis cardinal point of said wheel;
(d) directing said line of sight to impinge on said upper target at said first upper vertical axis cardinal point;
(e) locating said lower target at a second lower vertical axis cardinal point of said wheel;
(f) directing said line of sight to impinge on said lower target at said second lower vertical axis cardinal point, thereby checking vertical upper to lower camber alignment of said wheel;
(g) locating said front target at a first front horizontal axis cardinal point of said wheel;
(h) directing said line of sight to impinge on said front target at said first front horizontal axis cardinal point;
(i) locating said rear target at a second rear horizontal axis cardinal point of said wheel; and
(j) directing said line of sight at said rear target at said second rear horizontal axis cardinal point, thereby checking horizontal front to rear toe alignment of said wheel.

* * * * *